US011701682B1

(12) United States Patent
Logan

(10) Patent No.: US 11,701,682 B1
(45) Date of Patent: Jul. 18, 2023

(54) POWER PAINTING SYSTEM WITH A REMOTE CONTROL DEVICE THAT IS CONFIGURED TO TRIGGER A POWER PAINT TOOL BY VOICE COMMAND OR WIRELESSLY

(71) Applicant: Gordon Logan, Steamboat Springs, CO (US)

(72) Inventor: Gordon Logan, Steamboat Springs, CO (US)

( * ) Notice: Subject to any disclaimer, the term of this patent is extended or adjusted under 35 U.S.C. 154(b) by 0 days.

(21) Appl. No.: 17/989,064

(22) Filed: Nov. 17, 2022

Related U.S. Application Data

(60) Provisional application No. 63/352,102, filed on Jun. 14, 2022.

(51) Int. Cl.
  *B05C 17/03* (2006.01)
  *G06F 3/16* (2006.01)
  *G08C 17/02* (2006.01)

(52) U.S. Cl.
  CPC .......... *B05C 17/0341* (2013.01); *G06F 3/167* (2013.01); *G08C 17/02* (2013.01)

(58) Field of Classification Search
  CPC ....... B05C 17/002; G06F 3/167; G08C 17/02; A46B 11/06; B65D 33/16; G05D 16/2066; G05B 15/02
  See application file for complete search history.

(56) References Cited

U.S. PATENT DOCUMENTS

| 6,012,865 A * | 1/2000 | Scott .................... B05C 17/0333 492/19 |
| 6,500,262 B1 * | 12/2002 | Bednarz ................... B05B 15/00 118/308 |
| 10,758,933 B2 * | 9/2020 | Young, II ................ B05B 12/02 |
| 2002/0036568 A1 * | 3/2002 | Bredow ............... G05B 19/042 340/573.1 |
| 2014/0259534 A1 * | 9/2014 | Shields .................... B25G 1/04 16/429 |
| 2020/0001321 A1 * | 1/2020 | Carey ...................... B05B 9/01 |

* cited by examiner

*Primary Examiner* — Vernal U Brown
(74) *Attorney, Agent, or Firm* — Hall Estill Law Firm; Bryan A. Fuller

(57) ABSTRACT

A remote control operated power painting system. The power painting system includes a power paint tool for applying paint to a paintable surface and a power paint apparatus for supplying paint to the power paint tool. The power paint system also includes a flow control device fluidically disposed between the power paint tool and the power paint apparatus. The power painting system further includes a wireless remote control device for sending a signal to the flow control device to permit or prohibit the flow of paint from the power paint apparatus to the power paint tool. A method of painting a structure with a remote control operated power painting system. The method includes the step of starting a flow of paint through the power painting system wirelessly and applying paint to the structure with the power painting system. The method also includes the step of stopping the flow of paint through the power painting system wirelessly.

19 Claims, 5 Drawing Sheets

POWER PAINTING SYSTEM WITH A REMOTE CONTROL DEVICE THAT IS CONFIGURED TO TRIGGER A POWER PAINT TOOL BY VOICE COMMAND OR WIRELESSLY

CROSS-REFERENCE TO RELATED APPLICATIONS

The present application is a conversion of U.S. Provisional Application having U.S. Ser. No. 63/352,102, filed Jun. 14, 2022, which claims the benefit under 35 U.S.C. 119(e). The disclosure of which is hereby expressly incorporated herein by reference.

STATEMENT REGARDING FEDERALLY SPONSORED RESEARCH OR DEVELOPMENT

Not applicable.

BACKGROUND OF THE DISCLOSURE

1. Field of the Invention

Embodiments of the invention described in this specification relate generally to painting tools, and more particularly, to an electronic power paint tool remote control device that is configured to trigger a power paint tool by voice command or wirelessly to a hand trigger mounted to a paint extension pole.

2. Description of the Related Art

There are several painting styles or manners of painting in common use. Power rolling, spray rolling, and dipless brush painting are common for painting jobs but they involve the use a spray wand which limits the reach of any area in need of painting. Specifically, a spray gun is located at the end of the wand and is difficult to use and typically cannot reach high areas beyond thirteen feet. Using a spray wand extension on scaffolding or a ladder is dangerous as there is an added risk of falling which can injure the person who is painting. Adding an extension wand on to another wand increases the risk of one or both of the wands snapping when joined together.

The limited reach of existing wands are not originally made for use of with attachment tools, but are limited to just spraying. Consequently, they bend when attachments are made, resulting in wands that are damaged or broken for the intended use. The attachment of wands is also very heavy for their size and reach, and they tend to leak paint and cannot extend or detract like a paint extension pole.

Therefore, what is needed is a way to extend and detract the reach of a painter spraying and who can be in a comfortable standing position while engaged in the work to prevent or diminish fatigue, and which can be operated in a hands free manner so as to restrict, decrease, or increase spray gun paint by voice command or wireless trigger via a device that can be mounted anywhere along an extension pole or other.

SUMMARY OF THE DISCLOSURE

The present disclosure is directed to a remote control operated power painting system. The power painting system includes a power paint tool for applying paint to a paintable surface and a power paint apparatus for supplying paint to the power paint tool. The power paint system also includes a flow control device fluidically disposed between the power paint tool and the power paint apparatus. The power painting system further includes a wireless remote control device for sending a signal to the flow control device to permit or prohibit the flow of paint from the power paint apparatus to the power paint tool.

The present disclosure is also directed to a method of painting a structure with a remote control operated power painting system. The method includes the step of starting a flow of paint through the power painting system wirelessly and applying paint to the structure with the power painting system. The method also includes the step of stopping the flow of paint through the power painting system wirelessly.

DETAILED DESCRIPTION OF THE DISCLOSURE

In the following detailed description of the invention, numerous details, examples, and embodiments of the invention are described. However, it will be clear and apparent to one skilled in the art that the invention is not limited to the embodiments set forth and that the invention can be adapted for any of several applications.

Figure 1:
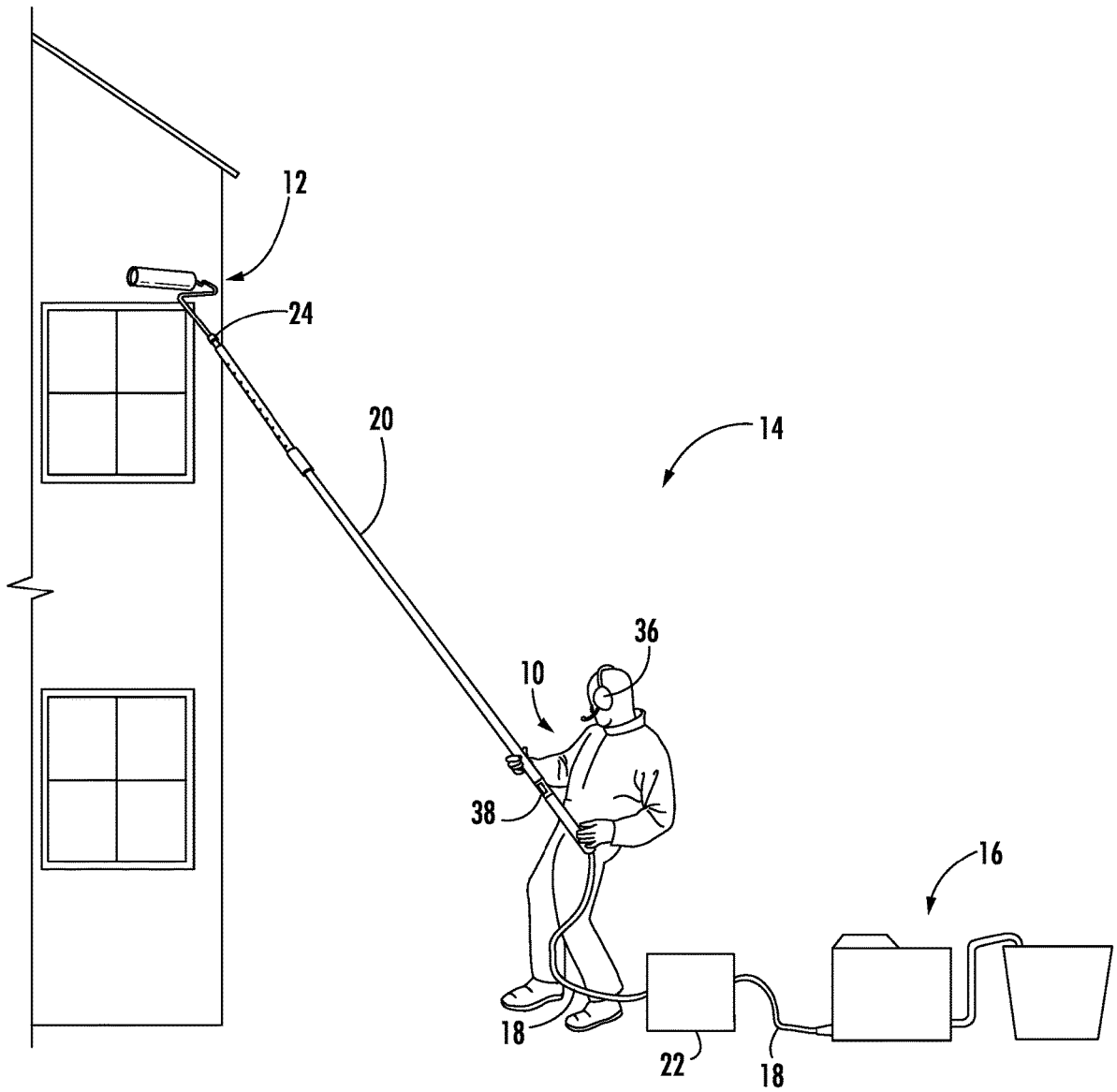
FIG. 1 is a view of a power painting system constructed in accordance with the present disclosure.
Figure 2:
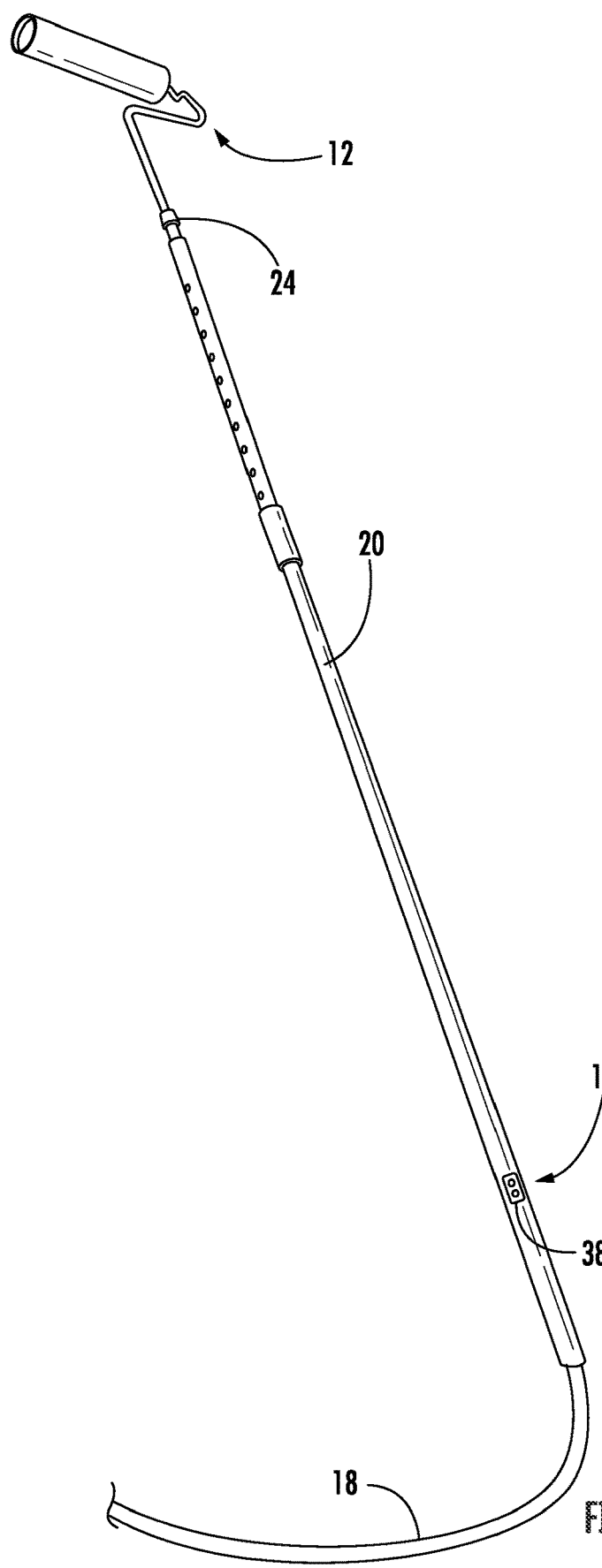
FIG. 2 is a perspective view of a portion of the power painting system constructed in accordance with the present disclosure.
Figure 3:
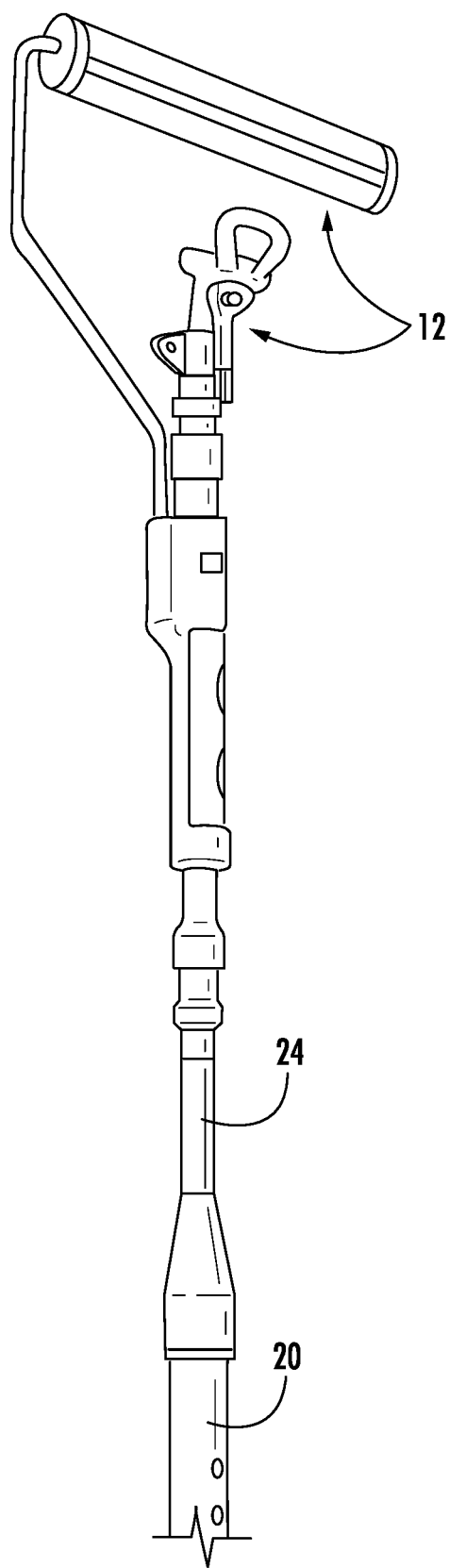
FIG. 3 is a perspective view of another portion of the power painting system constructed in accordance with the present disclosure.

Referring now to FIGS. 1-3, some embodiments include a remote control device 10 that is configured to trigger a power paint tool 12, such as a power roller, a power spray gun, combo sprayer/roller, or other tool, by voice command or wirelessly of a power painting system 14. In addition to the remote control device 10 and the power paint tool 12, the power painting system 14 can include a power paint apparatus 16 for supplying the power to the power painting system 14 and holding the paint to be used. The power paint apparatus 16 can be in fluid communication with the power paint tool 12, or deliver paint to the power paint tool 12, via sections of tubing 18. The power painting system 14 can also include an extension pole 20 to position the power paint tool 12 at a desired painting location and a flow control device 22 to permit paint to flow from the power paint apparatus 16 to the power paint tool 12 when desired. The flow control device 22 constructed to be in electronic communication with the remote control device 10. The sections of tubing 18 can be configured to connect the power paint apparatus 16 to the flow control device 22 and connect the flow control device 22 to the power paint tool 12. In another embodiment, the flow control device 22 can be built into power paint apparatus 16, thus no section of tubing 18.

The extension pole 20 can be telescopic to provide a range of heights the power paint tool 12 can be positioned to paint. The tubing 18 that connects the flow control device 22 and the power paint tool 12 can extend up through the extension pole 20 to engage a connector 24 supported on the end of the extension pole 20. The connector 24 can have the power paint tool 12 connected on one end and the tubing 18 connected on the other end.

In some embodiments, the remote control device 10 communicates with the flow control device 22 wirelessly by Bluetooth. In some embodiments, the power painting system 14 can be used by a person in a comfortable standing position and, therefore, reduces muscular fatigue during a painting job. In some embodiments, the remote control device 10 can be totally hands free of the power paint tool 12 and/or the extension pole and can be configured to cause increases or decreases of paint amounts by voice command.

In some embodiments, the flow control device 22 comprises (i) a controller 30 for processing commands, (ii) a valve device 26 that can be opened or closed to permit paint to flow therethrough, (iii) an actuator 27 that manipulates the valve device 26 according to a command, (iv) a wireless receiver 28 for receiving commands from the remote control device 10, and (v) a power source 34 for providing power to the components of the flow control device 22. The flow control device 22 can also include any other components necessary to operate as desired, such as memory for storing commands and any other desirable data. The sections of tubing 18 can be attached to the valve device 26 so the valve device 26 controls the flow of paint through the flow control device 22.

The remote control device 10 can include one of a wireless microphone headset 36 and a wireless trigger 38 comprising a Bluetooth transceiver configured to trigger based on a command signal. The wireless trigger 38 can be attached to the extension pole 20 at any desired location and by any means known in the art. The wireless trigger 38 could also be configured to receive voice commands via a microphone (not shown). The wireless trigger 38 can have all necessary components to send wireless signals to the flow control device 22. Voice commands received by the wireless microphone headset 36 or wireless trigger 38 can be transmitted to the flow control device 22 to get the desired functionality from the flow control device 22, such as open, closed, and various degrees of open. Examples of voice commands include, without limitation, spoken commands that sound something like "Open," "Closed," "Stop," "Off," "Spray," "Roll," "Feed 1," "Feed 2," "Feed 3," "Feed 4," etc., as separate commands. Each command would be configured to direct the flow control device 22 as to how much paint to dispense. The wireless trigger 38 could also be provided with various buttons for each command desired. For example, the wireless trigger 38 can have a button (or a combination of buttons) that corresponds to each spoken commands above.

The power painting system 14 of the present disclosure generally works by an automated mechanism that is configured to open the valve device 26 of the flow control device 22 to free up the use of having to use a heavy metal spray wand limited in height and limited areas of use for any tools that would be attached to it. In one embodiment, the valve device 26 can be a flow handle 40 that is used with power paint apparatuses 16 or power paint tools 12. The sections of tubing 18 can be attached to the flow handle 40 and the other components of the flow control device 22 can work with the flow handle 40 to control whether the flow handle 40 allows paint to flow to the power paint tool 12 and how much paint is allowed to flow to the power paint tool 12. In another embodiment, the valve device 26 can be any type of valve known in the art capable of being used to control the flow of paint. The actuator 27 can be of any type of actuator known in the art capable of working with (opening, partial opening and closing) the valve device 26. Examples of actuators 27 include, but are not limited to, servos, linear actuators, coils, and more.

Figure 4A:
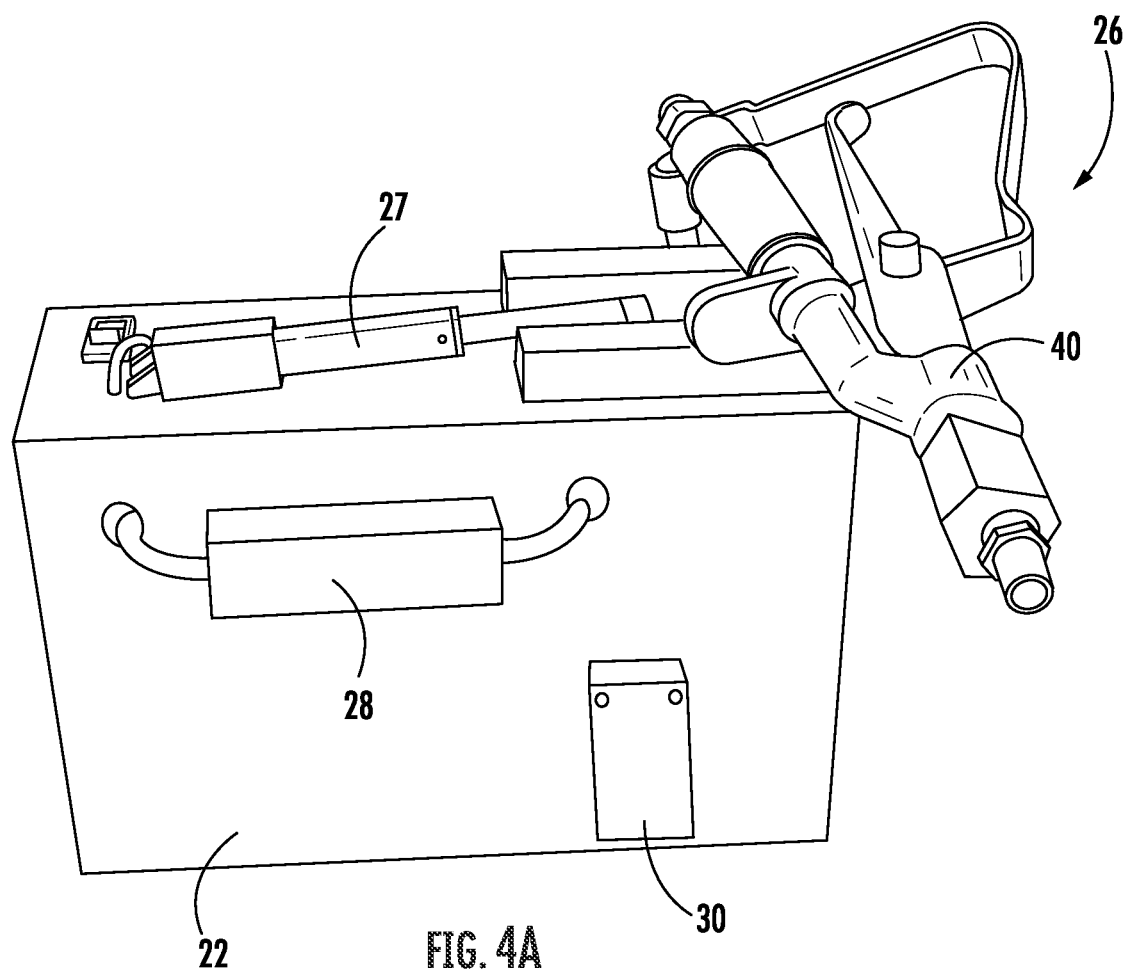
FIGS. 4A and 4B are perspective views of yet another portion of the power painting system constructed in accordance with the present disclosure.
Figure 4B:
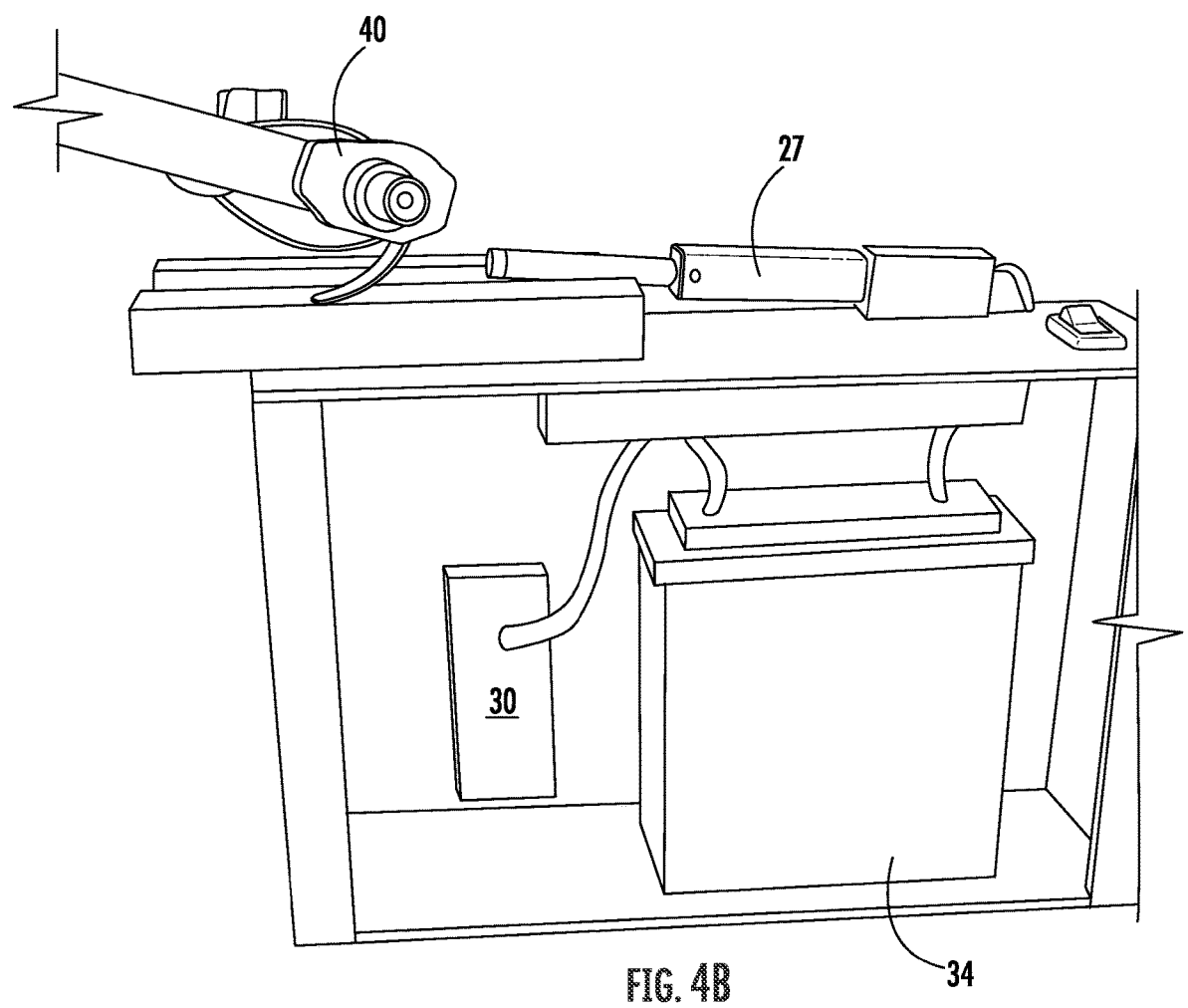

In an exemplary embodiment shown in FIGS. 4A and 4B, the flow control device 22 shows a flow handle 40 in use as the valve device 26, a battery as the power source 34, a liner actuator as the actuator 27, the wireless receiver 28 to receive the command from the headset 36 or the wireless trigger 38, the controller 30 and the necessary wiring components. The flow handle 40 is mounted to a box to prevent its movement when the actuator 27 causes the handle of the flow handle 40 to be squeezed via a ring member 42 attached to the actuator 27 and extending around the handle of the flow handle 40. It should be understood and appreciated that the valve device 26 and the actuator 27 of the valve device 26 can be any type of valve and actuator such that the valve can opened, partially opened and closed as desired.

From the above description, it is clear that the present disclosure is well-adapted to carry out the objectives and to attain the advantages mentioned herein as well as those inherent in the disclosure. While presently disclosed embodiments have been described herein, it will be understood that numerous changes may be made which will readily suggest themselves to those skilled in the art and which are accomplished within the spirit of the disclosure and claims.

What is claimed is:

1. A remote control operated power painting system, the system comprising:
   a power paint tool for applying paint to a paintable surface;
   a power paint apparatus for supplying power to the power painting system and holding the paint to be sent to the power paint tool;
   a flow control device fluidically disposed between the power paint tool and the power paint apparatus; and
   a wireless remote control device for sending a signal to the flow control device to permit or prohibit the flow of paint from the power paint apparatus to the power paint tool.

2. The system of claim 1 further comprising an extension pole for supporting the power paint tool and positioning the power paint tool at desired elevations.

3. The system of claim 2 wherein sections of tubing connect the power paint apparatus to the flow control device and connect the flow control device and the power paint tool, the section of tubing that connects the flow control device and the power paint tool extending up through the extension pole.

4. The system of claim 3 further comprising a connector that the extension pole can be secured to, the power paint tool can be secured to and the section of tubing delivering paint from the flow control device to the power paint tool can be secured to.

5. The system of claim 1 wherein the wireless remote control device can be a wireless trigger or a headset wherein the wireless trigger can be positioned on an extension pole.

6. The system of claim 5 wherein the headset can receive voice commands to remotely operate the flow control device.

7. The system of claim 1 wherein the flow control device includes:
   a valve device for opening and closing to control the flow of paint through the flow control device;
   an actuator for opening and closing the valve device;
   a controller for directing operation of the actuator;

a wireless receiver for receiving commands from the wireless remote control device and transmitting them to the controller; and a power source for providing electrical power to the flow control device.

8. The system of claim 7 wherein the valve device can be a hand sprayer that is coupled to the actuator.

9. The system of claim 7 wherein the valve device is a valve.

10. The system of claim 1 wherein the flow control device is built into the power paint apparatus.

11. A method of painting a structure with a remote control operated power painting system, the method comprising:
starting a flow of paint through the power painting system wirelessly, the power painting system comprising:
a power paint tool for applying paint to a paintable surface;
a power paint apparatus for supplying power to the power painting apparatus and holding the paint to be sent to the power paint tool;
a flow control device fluidically disposed between the power paint tool and the power paint apparatus; and
a wireless remote control device for sending a signal to the flow control device to permit or prohibit the flow of paint from the power paint apparatus to the power paint tool;
applying paint to the structure with the power painting system; and
stopping the flow of paint through the power painting system wirelessly.

12. The method of claim 11 further comprising an extension pole for supporting the power paint tool and positioning the power paint tool at desired elevations.

13. The method of claim 12 wherein sections of tubing connect the power paint apparatus to the flow control device and connect the flow control device and the power paint tool, the section of tubing that connects the flow control device and the power paint tool extending up through the extension pole.

14. The method of claim 13 further comprising a connector that the extension pole can be secured to, the power paint tool can be secured to and the section of tubing delivering paint from the flow control device to the power paint tool can be secured to.

15. The method of claim 11 wherein the wireless remote control device can be a wireless trigger or a headset wherein the wireless trigger can be positioned on an extension pole.

16. The method of claim 15 wherein the headset can receive voice commands to remotely operate the flow control device.

17. The method of claim 11 wherein the flow control device includes:
a valve device for opening and closing to control the flow of paint through the flow control device;
an actuator for opening and closing the valve device;
a controller for directing operation of the actuator;
a wireless receiver for receiving commands from the wireless remote control device and transmitting them to the controller; and
a power source for providing electrical power to the flow control device.

18. The method of claim 17 wherein the valve device can be a hand sprayer that is coupled to the actuator.

19. The method of claim 17 wherein the valve device is a valve.

* * * * *